UNITED STATES PATENT OFFICE.

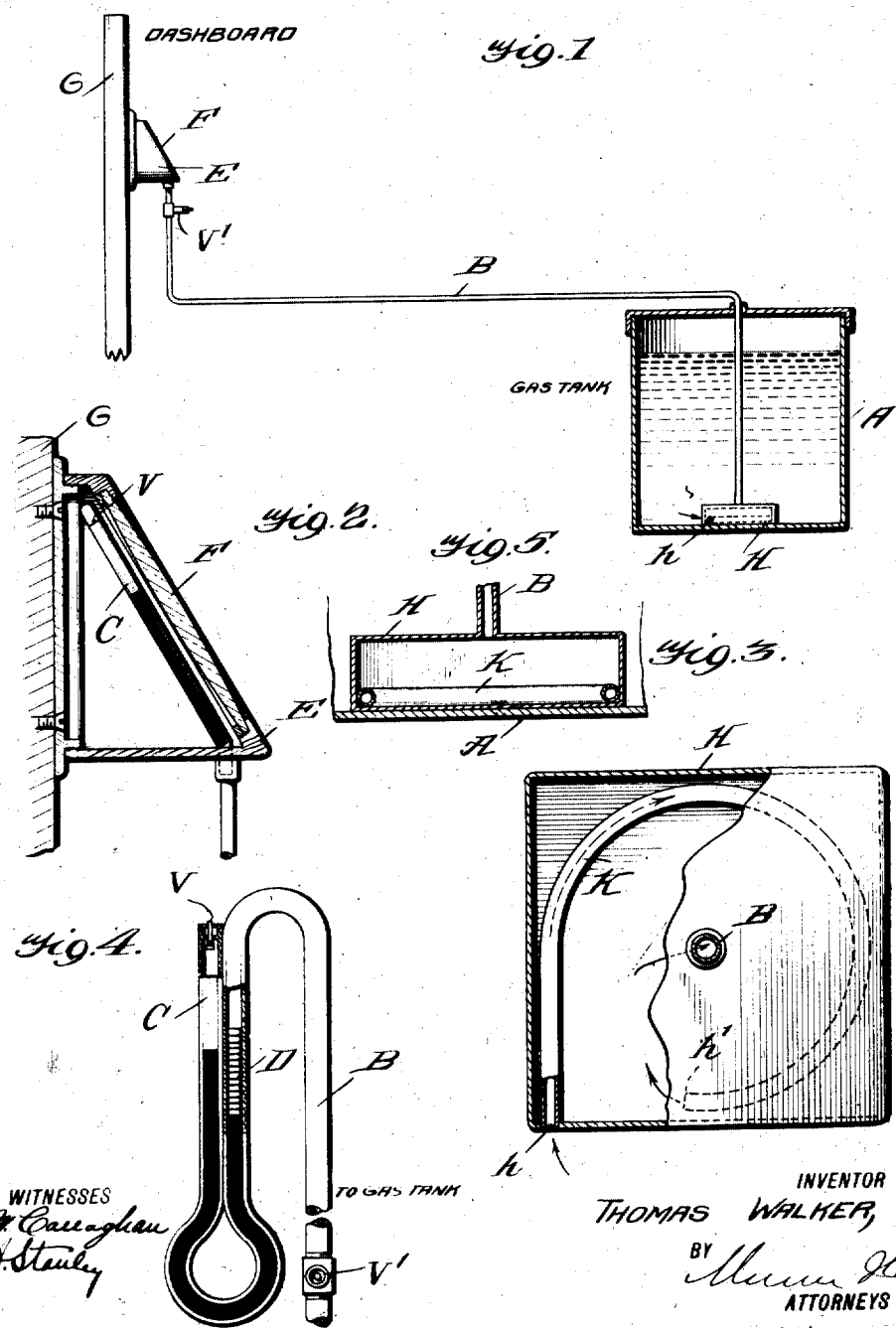

THOMAS WALKER, OF LOUISVILLE, KENTUCKY.

LIQUID-LEVEL GAGE.

1,250,056.   Specification of Letters Patent.   Patented Dec. 11, 1917.

Application filed January 10, 1917. Serial No. 141,626.

*To all whom it may concern:*

Be it known that I, THOMAS WALKER, a citizen of the United States, and a resident of Louisville, in the county of Jefferson and State of Kentucky, have invented a certain new and useful Improvement in Liquid-Level Gages, of which the following is a specification.

My invention relates to liquid gages, and it consists in the combinations, constructions, and arrangements herein described and claimed.

An object of my invention is primarily to provide a gasolene gage of the type in which the hydrostatic head of the liquid in the fuel tank determines the position of a liquid in a gage glass, the two being connected by means of an air tube, the novel feature of the invention being the provision of means by which the error in the reading of the gage glass, due to differences in temperature, is rendered negligible.

A further object of my invention is to provide a gasolene gage of the type described, in which the error is reduced to a minimum, and in which the parts are simple in construction and are, therefore, not liable to easily get out of order.

A further object of my invention is to provide a gasolene gage in which the movement of the vehicle has no appreciable effect on the accuracy of the gage glass, due to the particular manner in which certain parts are arranged.

Other objects and advantages will appear in the following specification, and the novel features of the invention will be particularly pointed out in the appended claims.

My invention is illustrated in the accompanying drawings forming part of this application, in which:

Figure 1 shows the general arrangement of the parts, the gasolene tank being shown in section;

Fig. 2 is an enlarged sectional detail view of the gage glass holder;

Fig. 3 is a plan view of an auxiliary air box, a portion of the box being shown in section;

Fig. 4 is a face view of a portion of the gage glass, and

Fig. 5 is a section through the box.

In gasolene gages which depend for their operation upon the movement of a column of liquid due to changes in the hydrostatic head in the fuel tank, or, in other words, to the amount of fuel in the tank, and which make use of air as a means of transmitting the pressure, large variations of temperature are apt to cause the air to expand or contract and to render the reading therefor inaccurate, and often wholly useless.

The present invention is designed to reduce to a minimum, that is to say, to a negligible quantity, the error which must always exist in gages of this type due to the differences in temperature.

In carrying out my invention I make use of a tank of any suitable type, such as that shown at A in Fig. 1. The drawing shows a tank of a substantially square cross section, but obviously it may be of other forms, without departing from the spirit of the invention. An air pipe B is connected at one end with a U-shaped tube C which contains a liquid, such as mercury, and which is provided with a scale D. At one end of the tube C is a valve V, while a second valve V' is carried by the tube B. A float is provided in the U-shaped tube C for indicating the height of the column of liquid in the tube.

The U-shaped tube C is preferably located in a holder E provided with a lens F, by means of which the scale D may be easily read. The tube is preferably tilted at an angle, so as to be easily seen by the driver of the vehicle. The holder E is preferably secured to the dash G of the automobile or other vehicle.

The pipe B, as will be seen from Fig. 1, passes into the gasolene tank A. At the bottom of the gasolene tank is a box H which has in it a coiled tube K having one end opening into the gasolene tank, as shown at *h*, and the opposite end opening into the box H. The pipe B communicates with the interior of the box H at its top.

From the foregoing description of the various parts of the device, the operation thereof may be readily understood.

The gasolene tank may be located at any convenient part of the vehicle, but the provision of the pipe B permits the gage to be placed always on the dash. Consider the action of the device if the box H were not present, i. e., if the tube B terminated near the bottom of the tank. If gasolene is poured into the tank, the air pressure in the tube B will cause the depression of the column of mercury in the arm bearing the scale D, and the rise of the mercury in the adjacent column. If the temperature could be maintained constant, then the amount of gasolene in the tank could be accurately observed by the difference in height of the columns of mercury. In actual practice, however, there is a considerable variation of temperature.

Let us assume that the temperature of all the parts is lowered 100° F. It is quite apparent that the air contained in the tube B between the mercury and the gasolene would contract about one-fifth or to about four-fifths of its former volume, and gasolene will be drawn up inside of the tube B to a distance approximately one-fifth of the length of the tube.

As the gasolene is drawn up into the tube, the head between the top of the gasolene in the tank and the top of the gasolene in the tube is reduced, and the difference in elevation of the columns of mercury is correspondingly reduced. Obviously, unless the variation due to temperature can be offset, the device would have little or no practical value.

Now, by adding an auxiliary air space, such as that in the box H, the error is reduced to a minimum. For, let us assume that the tube from the tank to the dashboard is ten feet long by one-eighth of an inch diameter inside, and that a box two and one-half inches square by five-eighths inches deep communicates, by means of the tube, with the U-shaped gage glass, containing the mercury. The cubic contents of the tube would be 1.47 cubic inches, and the contents of the box 3.92 cubic inches. Therefore, the total volume of air contained in the tube and the box would be 5.39 cubic inches.

Assuming a maximum reduction of 150° F., this would cause the air to contract about one-fourth or 1.24 cubic inches; which would cause a rise of the gasolene in the box H about two tenths of an inch. This could be disregarded for practical purposes, as far as its effect on the movement of the column of mercury is concerned.

In order to prevent the movement of the vehicle from causing the air in the box H to escape into the gasolene tank, I provide the coil K. This provides a passage for the gasolene which is disposed horizontally, that is to say, at right angles to the line in which the shocks or jars will come, and allows the liquid to flow through the tube without affecting the hydrostatic head.

The valve V' is similar to a bicycle valve, and is for the purpose of charging the tube B with air from time to time, if necessary. The valve V is for the purpose of preventing the mercury from being forced out of the end of the tube, since this valve will close as soon as the mercury reaches it, when the air is being forced into the tube B.

Instead of having a scale on a float within the U-shaped tube, the scale may be on the outside, but in using the floating scale one can see at a glance the differences in height of the two columns of mercury, while with a scale on the outside of the tube, one has to calculate this difference.

The device described above will reduce the error due to vaporization as well as to temperature. Vaporization will increase the error, but the device will offset it satisfactorily. Vaporization is, of course, dependent upon the temperature (and pressure), and a change in temperature would mean a change in vapor pressure.

Obviously other liquids besides mercury might be used in the gage glass, without departing from the spirit and scope of the invention.

I claim:—

1. In a gasolene gage, a gage glass having a liquid therein and being provided with a scale to indicate the height of the liquid, a casing or box disposed in the gasolene tank on the bottom thereof, said casing having a horizontal coil disposed therein, said coil communicating at one end with the interior of the gasolene tank and at the other with the interior of the casing, and means for establishing communication between the gage glass and the casing.

2. The combination with a gasolene tank of a casing or box disposed in the gasolene tank on the bottom thereof, means for establishing communication between said gage and said casing, a horizontal coiled tube disposed within the casing, one end of said tube communicating with the interior of the gasolene tank and the other end of the tube communicating with the interior of the casing, said tube being of less diameter than the height of the casing.

3. The combination with a gasolene tank of a gage glass, a box or casing disposed within the gasolene tank on the bottom thereof, a pipe connecting the top of the casing with said gage glass, a coiled tube disposed in horizontal position, one end of said tube being secured to the side of the casing and communicating with the interior of the casing, the opposite end being open to the interior of the casing, one end of the tube being substantially at right angles to the other end.

4. The combination with a gasolene tank of a gage glass, a box or casing disposed within the gasolene tank, said box having a relatively small height as compared with the tank, a conduit disposed within the casing, said conduit being in horizontal position, one end of the conduit communicating with the interior of the gasolene tank and the other end of the conduit being open to the interior of the casing, and means for establishing communication between the casing and the gage.

THOMAS WALKER.